United States Patent
Takahashi et al.

(10) Patent No.: US 11,437,881 B2
(45) Date of Patent: Sep. 6, 2022

(54) MOTOR INCLUDING COVER WITH THROUGH-HOLE

(71) Applicant: NIDEC SERVO CORPORATION, Kiryu (JP)

(72) Inventors: Ryotaro Takahashi, Kiryu (JP); Koji Mizukami, Kiryu (JP)

(73) Assignee: NIDEC SERVO CORPORATION, Gunma (JM)

( * ) Notice: Subject to any disclaimer, the term of this patent is extended or adjusted under 35 U.S.C. 154(b) by 220 days.

(21) Appl. No.: 16/643,601

(22) PCT Filed: Sep. 18, 2018

(86) PCT No.: PCT/JP2018/034335
§ 371 (c)(1),
(2) Date: Mar. 2, 2020

(87) PCT Pub. No.: WO2019/065340
PCT Pub. Date: Apr. 4, 2019

(65) Prior Publication Data
US 2020/0350801 A1 Nov. 5, 2020

(30) Foreign Application Priority Data

Sep. 29, 2017 (JP) .............................. JP2017-191858

(51) Int. Cl.
H02K 5/22 (2006.01)
(52) U.S. Cl.
CPC .................................... *H02K 5/225* (2013.01)
(58) Field of Classification Search
CPC ................................. H02K 5/22; H02K 5/225
See application file for complete search history.

(56) References Cited

U.S. PATENT DOCUMENTS

2015/0381017 A1* 12/2015 Kitaji ..................... H02K 29/06
310/68 B

FOREIGN PATENT DOCUMENTS

| CN | 204103055 U | * | 1/2015 |
| CN | 204103055 U | | 1/2015 |
| JP | 2014-017919 A | | 1/2014 |
| JP | 2014017919 A | * | 1/2014 |

(Continued)

OTHER PUBLICATIONS

Official Communication issued in corresponding Chinese Patent Application No. 201880058565.1, dated Aug. 4, 2021.

*Primary Examiner* — Quyen P Leung
*Assistant Examiner* — Eric Johnson
(74) *Attorney, Agent, or Firm* — Keating & Bennett

(57) ABSTRACT

A motor includes a sheet-metal cover accommodating a stator and a substrate and a wiring assembly electrically connected to the substrate. The cover includes a wiring lead port, which is open to a wall of the cover and communicates with an outside and an inside of the cover. The wiring assembly includes cables connected to the substrate and extending from the inside of the cover to the outside through the wiring lead port, a sleeve with a tubular shape into which the cables are inserted, the sleeve having an elastic modulus smaller than an elastic modulus of a coated portion of the cable, and a binder that bundles the cables through the sleeve. The sleeve is opposed to the wiring lead port from the inside of the cover, and an outer diameter of the sleeve is larger than an inner diameter of the wiring lead port.

10 Claims, 6 Drawing Sheets

(56) References Cited

FOREIGN PATENT DOCUMENTS

| | | | | |
|---|---|---|---|---|
| JP | 2015-104190 A | | 6/2015 | |
| JP | 2015104190 A | * | 6/2015 | |
| KR | 20090065937 A | * | 6/2009 | |
| WO | WO-2013157035 A1 | * | 10/2013 | ............. H02K 3/522 |

* cited by examiner

MOTOR INCLUDING COVER WITH THROUGH-HOLE

CROSS REFERENCE TO RELATED APPLICATIONS

This is a U.S. national stage of PCT Application No. PCT/JP2018/034335, filed on Sep. 18, 2018, and priority under 35 U.S.C. § 119(a) and 35 U.S.C. § 365(b) is claimed from Japanese Application No. 2017-191858, filed Sep. 29, 2017; the entire disclosures of each of which are hereby incorporated herein by reference.

FIELD

The present disclosure relates to a motor.

BACKGROUND

Conventionally, in a cable in which a wire is wrapped in an outer skin, an anchor member is provided inside the outer skin to increase an outer diameter of the cable, thereby preventing the cable from slipping out.

Even in a cable that does not include the outer skin, there is a need for preventing the cable from slipping out. When the cover of the motor is made of sheet metal, a structure preventing the cable from slipping out cannot be formed in the cover.

SUMMARY

A motor according to an example embodiment of the present disclosure includes a rotor, a stator, a substrate electrically connected to the stator, a cover made of sheet metal and accommodating the stator and the substrate, and a wiring assembly electrically connected to the substrate. The cover includes a wiring lead port, which is open to a wall of the cover and communicates with an outside and an inside of the cover, the wiring assembly includes a plurality of cables connected to the substrate and extending from the inside of the cover to the outside through the wiring lead port, a sleeve with a tubular shape into which the plurality of cables are inserted, the sleeve having an elastic modulus smaller than an elastic modulus of a coated portion of the cable, and a binder that bundles the plurality of cables through the sleeve, the sleeve is opposed to the wiring lead port from the inside of the cover, and an outer diameter of the sleeve is larger than an inner diameter of the wiring lead port.

The above and other elements, features, steps, characteristics and advantages of the present disclosure will become more apparent from the following detailed description of the example embodiments with reference to the attached drawings.

DETAILED DESCRIPTION

Figure 1:
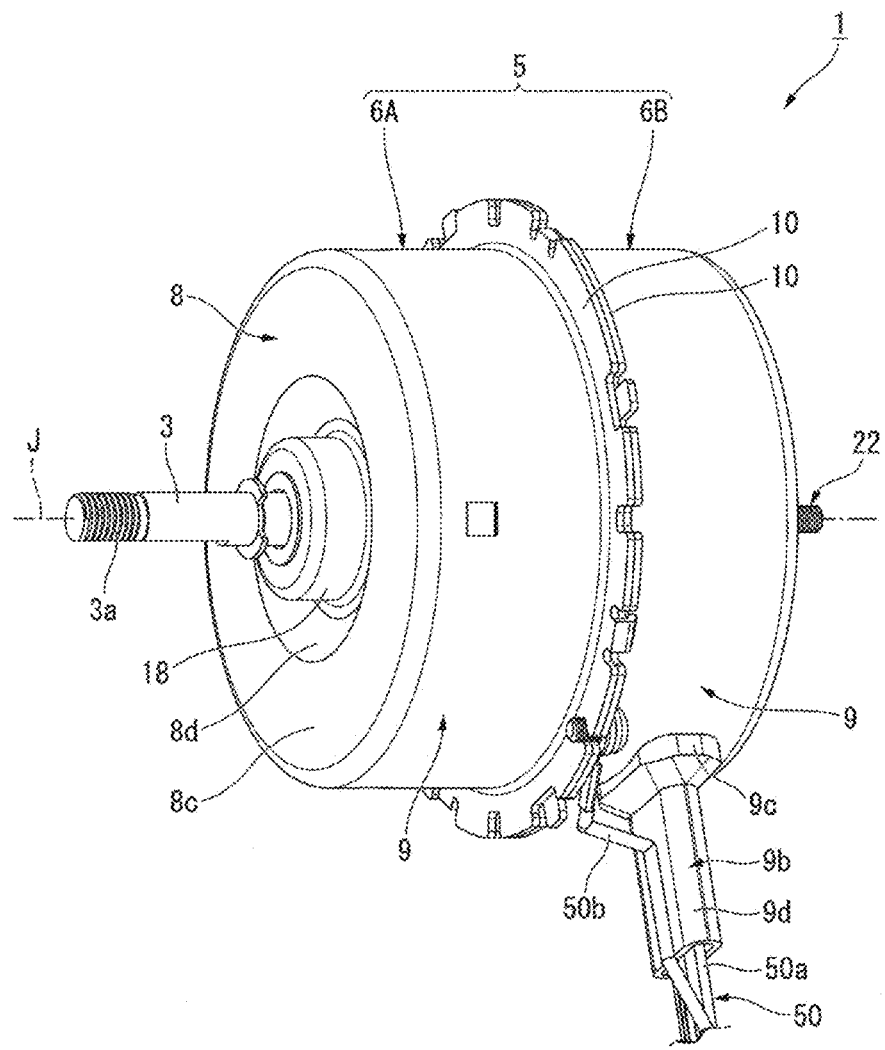
FIG. 1 is a perspective view illustrating a motor according to an example embodiment of the present disclosure.
Figure 2:
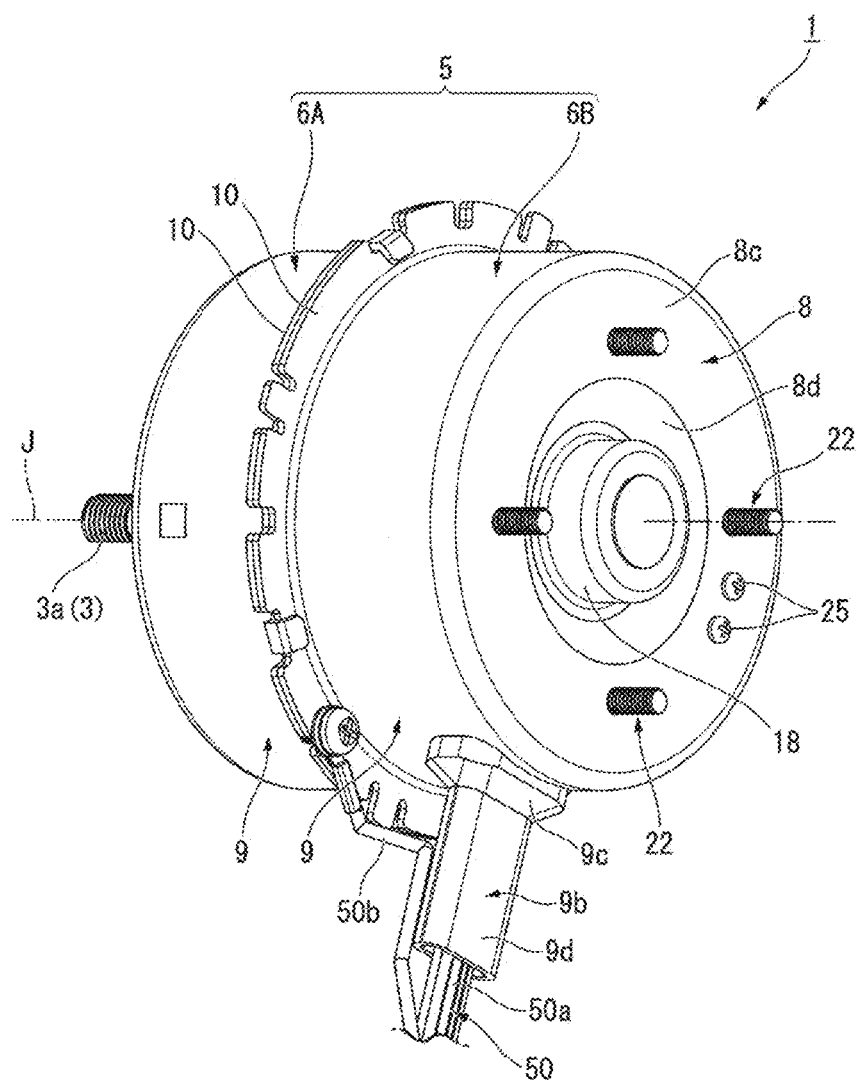
FIG. 2 is a perspective view illustrating a motor according to an example embodiment of the present disclosure.

As illustrated in FIGS. 1 to 5, a motor 1 according to an example embodiment includes a cover 5, a stud bolt 22, a wiring member 50, a rotor 2 including a motor shaft 3 extending along a center axis J, a stator 4, a pair of bearings 7, a substrate 20, a heat sink 21, and a screw member 25. A first end at which an output end 3a is located, out of both ends of the motor shaft 3, is disposed outside the cover 5. A fan or the like (not illustrated) rotated by the motor 1 is connected to an output end 3a.

In the example embodiment, a direction parallel to the center axis J is simply referred to as an "axial direction". A direction from the first end at which the output end 3a is located toward a second end different from the first end in both the ends of the motor shaft 3 is referred to as one side in the axial direction. One side in the axial direction is a left side in FIG. 4. A direction from the second end of the motor shaft 3 toward the first end is referred to as the other side in the axial direction. The other side in the axial direction is a right side in FIG. 4. A radial direction about the center axis J is simply referred to as a "radial direction". In the radial direction, a direction coming close to the center axis J is referred to as a radial inside, and a direction separating from the center axis J is referred to as a radial outside. A circumferential direction centered on the center axis J is simply referred to as a "circumferential direction".

Figure 4:
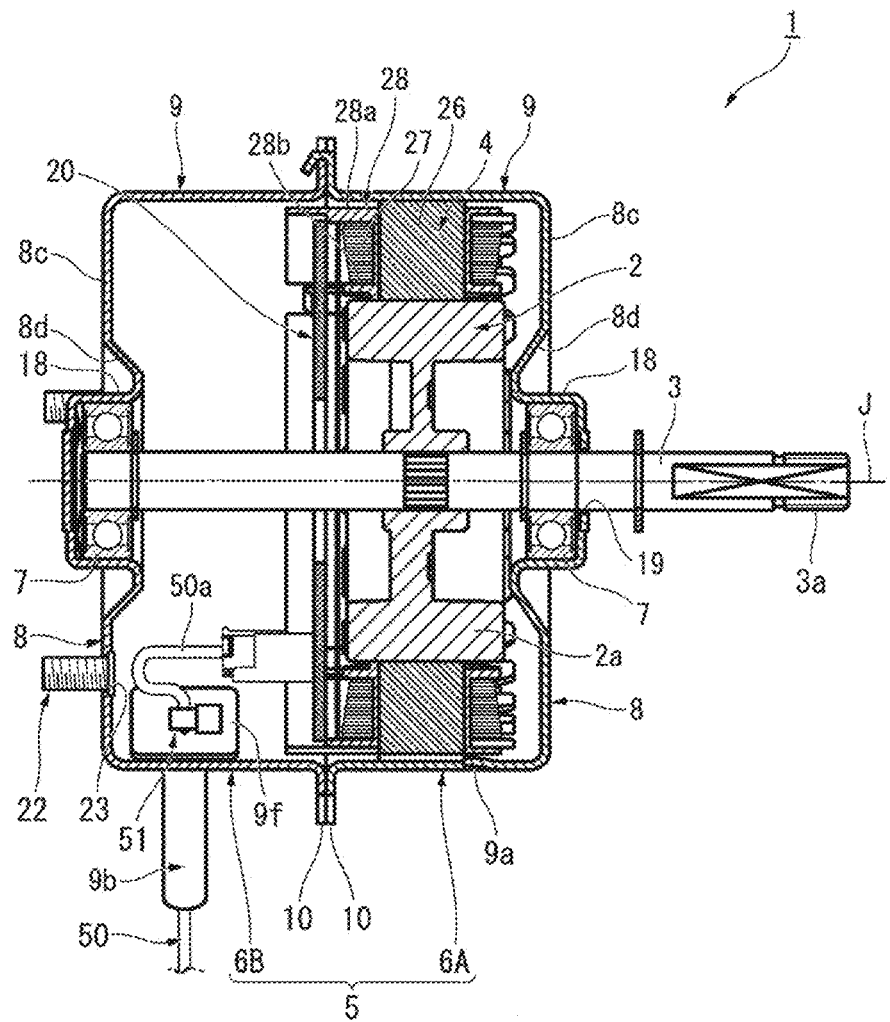
FIG. 4 is a sectional view taken along a line IV-IV in FIG. 3.

As illustrated in FIG. 4, the cover 5 accommodates the rotor 2, the stator 4, the bearing 7, the substrate 20, and the heat sink 21 (not illustrated). The cover 5 includes a first cup body 6A and a second cup body 6B. The cover 5 includes the first cup body 6A and the second cup body 6B that have a bottomed tubular shape. Each of the first cup body 6A and the second cup body 6B has the bottomed cylindrical shape centered on the center axis J.

In the example of the example embodiment, a rotor magnet 2a (to be described later) of the rotor 2, the stator 4, and one of the pair of bearings 7 located on the other side in the axial direction are accommodated in the first cup body 6A. One of the pair of bearings 7 located on one side in the axial direction, the substrate 20, and the heat sink 21 are accommodated in the second cup body 6B.

The cover 5 is made of sheet metal. The first cup body 6A and the second cup body 6B are made of sheet metal. For example, the first cup body 6A and the second cup body 6B are made of a steel plate. The first cup body 6A and the second cup body 6B are equal to each other in a radial dimension. The first cup body 6A and the second cup body 6B are press-molded into a cup shape using the same metal mold. That is, the first cup body 6A and the second cup body 6B are a press molded product. The cover 5 is a press cover.

The first cup body 6A is located on the other side in the axial direction with respect to the second cup body 6B. The second cup body 6B is located on one side in the axial direction with respect to the first cup body 6A. The first cup body 6A is open onto one side in the axial direction. The second cup body 6B is open onto the other side in the axial direction. Each of the first cup body 6A and the second cup body 6B includes a bottom wall 8, a circumferential wall 9, and a flange 10. That is, the cover 5 includes the bottom wall 8 and the circumferential wall 9 as a wall. The first cup body 6A and the second cup body 6B are disposed while openings of the circumferential walls 9 of the first cup body 6A and the second cup body 6B are opposed to each other. The first cup body 6A and the second cup body 6B are fixed to each other while openings of the first cup body 6A and the second cup body 6B are opposed to each other in the axial direction. The flanges 10 of the first cup body 6A and the second cup body 6B are fixed to each other. An inside of the first cup body 6A and an inside of the second cup body 6B communicate with each other while the first cup body 6A and the second cup body 6B are fixed to each other.

The bottom wall 8 includes a bearing holder 18, a flat unit 8c, and a connection unit 8d. The bearing holder 18 has a bottomed tubular shape. The bearing holder 18 has the bottomed cylindrical shape centered on the center axis J. The bearing holder 18 is open toward the inside of the cover 5. The bearing holder 18 holds the bearing 7. For example, the bearing 7 is a ball bearing. The bearing 7 is fitted in and fixed to the bearing holder 18. In the cover 5, the pair of bearings 7 is disposed away from each other in the axial direction. The pair of bearings 7 is disposed at both the ends in the axial direction of the cover 5. The pair of bearings 7 rotatably supports the motor shaft 3. The bearing 7 rotatably supports the motor shaft 3 about the center axis J.

A shaft insertion hole 19 axially penetrating the bottom wall 8 is made in the bottom wall 8 of the first cup body 6A. The shaft insertion hole 19 is made in the bearing holder 18 of the first cup body 6A. The shaft insertion hole 19 is a through-hole penetrating a bottom of the bearing holder 18. The motor shaft 3 is inserted into the shaft insertion hole 19. The motor shaft 3 protrudes outward from the inside of the cover 5 through the shaft insertion hole 19.

The flat unit 8c has an annular shape extending in the circumferential direction. The flat unit 8c has an annular plate shape centered on the center axis J. A plate surface of the flat unit 8c is oriented toward the axial direction, and spreads in a direction orthogonal to the center axis J. A radial position of the flat unit 8c is disposed outside a radial position of the bearing holder 18. The flat unit 8c surrounds the bearing holder 18 from the radial outside. The flat unit 8c is disposed at a position overlapping the bearing holder 18 as viewed in the radial direction. The flat unit 8c is connected to the circumferential wall 9. An outer edge of the flat unit 8c is connected to the end of the circumferential wall 9 on an opposite side to the opening along the axial direction.

A stud through-hole 23 is made in the bottom wall 8 of the second cup body 6B. The second cup body 6B includes a plurality of stud through-holes 23 axially penetrating the bottom wall 8.

For example, the stud through-hole 23 is a circular hole. The stud through-hole 23 is made in the flat unit 8c of the second cup body 6B. The stud through-hole 23 axially penetrates the flat unit 8c of the second cup body 6B. The plurality of stud through-holes 23 are circumferentially made away from each other in the bottom wall 8. The plurality of stud through-holes 23 are circumferentially made at equal intervals in the flat unit 8c.

A plurality of stud bolts 22 are provided in the bottom wall 8 of the second cup body 6B. The stud bolt 22 protrudes from the bottom wall 8 of the second cup body 6B onto one side in the axial direction. The plurality of stud bolts 22 are circumferentially arranged at intervals in the bottom wall 8. In the illustrated example, four stud bolts 22 are circumferentially provided at equal intervals in the bottom wall 8. The stud bolt 22 is inserted into the stud through-hole 23, and attached to the bottom wall 8. The stud bolt 22 is press-fitted in the stud through-hole 23, and fixed to the flat unit 8c.

Using the stud bolt 22, the motor 1 is attached and fixed to a device frame (not illustrated) to which the motor 1 is attached.

A screw attachment hole (not illustrated) is made in the bottom wall 8 of the second cup body 6B. The second cup body 6B includes the screw attachment hole axially penetrating the bottom wall 8. For example, the screw attachment hole is a circular hole. A plurality of screw attachment holes are made in the flat unit 8c of the second cup body 6B. The screw attachment hole axially penetrates the flat unit 8c of the second cup body 6B. The plurality of screw attachment holes are circumferentially made away from each other in the bottom wall 8. The two screw attachment holes are made. A screw member 25 (to be described later) is inserted into the screw mounting hole.

The connection unit 8d connects the bearing holder 18 and the flat unit 8c. The connection unit 8d connects an opening of a tubular portion of the bearing holder 18 and an inner circumferential edge of the flat unit 8c. The connection unit 8d is disposed between the bearing holder 18 and the flat unit 8c. The connection unit 8d is located between the bearing holder 18 and the flat unit 8c along the radial direction. In the example of the example embodiment, the connection unit 8d has a tapered tubular shape centered on the center axis J. The connection unit 8d extends toward an opening side of the circumferential wall 9 along the axial direction as going from the flat unit 8c toward the radial inside. That is, the connection unit 8d of the first cup body 6A extends toward one side in the axial direction as going from the flat unit 8c toward the radial inside. The connection unit 8d of the second cup body 6B extends toward the other side in the axial direction as going from the flat unit 8c toward the radial inside.

The circumferential wall 9 has a tubular shape centered on the center axis J. The circumferential wall 9 has a cylindrical shape. The circumferential wall 9 extends axially from the outer circumferential edge of the bottom wall 8. The circumferential wall 9 is open onto the opposite side to the bottom wall 8 along the axial direction. The opening is located at the end of the circumferential wall 9 on the opposite side to the bottom wall 8 along the axial direction. The end portion of the circumferential wall 9 on the side opposite to the opening along the axial direction is closed by the bottom wall 8.

A plurality of stator support claws 9a are provided in the circumferential wall 9 of the first cup body 6A. The stator support claw 9a protrudes from the circumferential wall 9 toward the inside of the first cup body 6A. The plurality of stator support claws 9a are circumferentially disposed at equal intervals in the circumferential wall 9. The stator support claw 9a contacts with the stator 4 disposed in the first cup body 6A from the other side in the axial direction. The stator support claw 9a supports the stator 4 toward one side in the axial direction.

Figure 6:
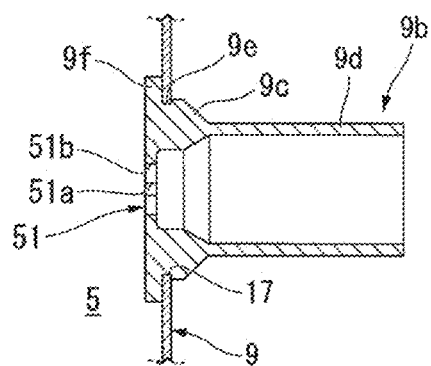
FIG. 6 is a sectional view illustrating a bush.

As illustrated in FIGS. 1 to 4 and 6, the circumferential wall 9 of the second cup body 6B includes a through-hole 17 and a bush 9b. That is, the cover 5 includes the through-hole 17 and the bush 9b. In FIG. 6, the left side of the drawing is the "radial inside" and the right side of the drawing is the "radial outside". The through-hole 17 is made in the circumferential wall of the second cup body 6B, and radially pierces the circumferential wall 9. For example, the through-hole 17 has a polygonal hole shape. In the example of the example embodiment, the through-hole 17 has a rectangular hole shape.

Figure 7:
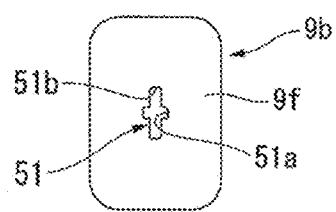
FIG. 7 is a front view illustrating the bush.

The bush 9b is inserted into the through-hole 17, and fixed to the circumferential wall 9. The bush 9b is attached to the through-hole 17. The bush 9b is elastically deformable. The bush 9b has a bottomed tubular shape. The bush 9b has a polygonal tubular shape. In the example of the example embodiment, the bush 9b has a square tubular shape having a rectangular section. The end on the radial inside of the bush 9b is closed by the bottom. A wiring lead port 51 is open to a central portion of the bottom of the bush 9b. As illustrated in FIGS. 6 and 7, the wiring lead port 51 includes a first slit 51a and a second slit 51b that extend while intersecting each other. A length of the first slit 51a is shorter than a length of the second slit 51b. In the example embodiment, the wiring lead port 51 is provided in the bush 9b. The wiring lead port 51 is disposed in the bush 9b. That is, the cover 5 includes the wiring lead port 51. The wiring lead port 51 is a portion located in the bottom of the hole radially penetrating the bush 9b. The wiring lead port 51 is open to the circumferential wall 9 of the cover 5, and communicates with the outside and the inside of the cover 5.

The bush 9b extends from the inside to the outside of the cover 5 through the through-hole 17. In the bush 9b, an inner end 9c contacting with the circumferential wall 9 from the radial outside has an outer diameter larger than that of an outside 9d located on the radial outside of the inner end 9c. As illustrated in FIG. 6, the inner end 9c of the bush 9b has an inner diameter smaller than that of the outside 9d. That is, a thickness of the inner end 9c is thicker than a thickness of the outside 9d. The bush 9b has a flange 9f located inside the cover 5. The flange 9f is opposed to the circumferential wall 9 from the inside of the cover 5. The flange 9f contacts with the circumferential wall 9 from the inside of the cover 5. In an outer circumferential surface of the bush 9b, a groove 9e fitted in the through-hole 17 is provided in a portion located between the flange 9f and the inner end 9c. The groove 9e extends over an entire outer circumference of the bush 9b.

As illustrated in FIGS. 1 to 4, the flange 10 has an annular shape, and extends radially outward from an end edge of the circumferential wall 9 on the side opposite to the bottom wall 8. The flange 10 has an annular plate shape spreading radially outward from an end of the circumferential wall 9 on the side opposite to the bottom wall 8 along the axial direction. A plate surface of the flange 10 faces the axial direction, and spreads in the direction orthogonal to the center axis J. The plate surface of the first cup body 6A facing one side in the axial direction of the flange 10 contacts with the plate surface of the second cup body 6B facing the other side in the axial direction of the flange 10.

Figure 5:
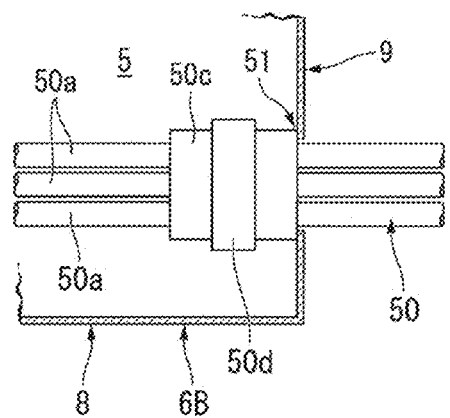
FIG. 5 is a sectional view illustrating a wiring lead port of a cover and a wiring assembly in a simplified manner.

As illustrated in FIG. 4, the wiring member 50 is electrically connected to the substrate 20. As illustrated in FIGS. 1 to 5, the wiring member 50 includes a plurality of cables 50a, one ground wiring 50b, a sleeve 50c, and a binding unit 50d. In FIG. 5, the left side of the figure is the "radial inside", and the right side of the figure is the "radial outside". The bush 9b included in the circumferential wall 9 is omitted in FIG. 5. The plurality of cables 50a are connected to the substrate 20, and extend from the inside to the outside of the cover 5 through the wiring lead port 51. That is, the cable 50a extends from the inside to the outside of the cover 5 through the inside of the bush 9b. As illustrated in FIG. 4, the cable 50a extends while being curved between the wiring lead port 51 and the substrate 20. The cable 50a may be paraphrased in a substrate wiring. The ground wiring 50b is electrically connected to the cover 5. The ground wiring 50b is connected to the flange 10. The ground wiring 50b is fixed to the flange 10 by a screw.

As illustrated in FIG. 5, the sleeve 50c has a tubular shape into which a plurality of cables 50a are inserted. The sleeve 50c has an elastic modulus smaller than that of a coated portion of the cable 50a. That is, the sleeve 50c is softer than the coated portion of the cable 50a. The sleeve 50c is a heat-shrinkable tube. The sleeve 50c contacts with all the plurality of cables 50a. That is, all the cable 50a passing through the inside of the sleeve 50c contact with the inner circumferential surface of the sleeve 50c. The sleeve 50c is opposed to the wiring lead port 51 from the inside of the cover 5. The end on the radial outside of the sleeve 50c is opposed to the wiring lead port 51 from the radial inside. An outer diameter of the sleeve 50c is larger than an inner diameter of the wiring lead port 51. The length of the first slit 51a is smaller than the outer diameter of the sleeve 50c.

As illustrated in FIG. 5, the binding unit 50d bundles the plurality of cables 50a through the sleeve 50c. The length of the sleeve 50c in the direction in which the cable 50a extends is longer than the length of the binding unit 50d. The binding unit 50d is located inside the both ends of the sleeve 50c. That is, the sleeve 50c protrudes outward from both ends of the binding unit 50d along the extending direction of the cable 50a. A frictional coefficient between the sleeve 50c and the cable 50a is larger than a frictional coefficient between the sleeve 50c and the binding unit 50d. That is, the sleeve 50c and the cable 50a are difficult to move relative to each other in the direction in which the cable 50a extends.

As illustrated in FIG. 4, the rotor 2 includes the motor shaft 3 and the rotor magnet 2a. In the motor shaft 3, a portion supported by the pair of bearings 7 and a portion located between the pair of bearings 7 are disposed inside the cover 5. In the motor shaft 3, a portion located closer to the other side in the axial direction than the bearing 7 accommodated in the first cup body 6A is disposed outside the cover 5. The motor shaft 3 and the pair of bearings 7 are prevented from moving in the axial direction using a snap ring or the like. The rotor magnet 2a has a tubular shape centered on the center axis J. The rotor magnet 2a has a cylindrical shape. The rotor magnet 2a is fixed to the outer circumferential surface of the motor shaft 3.

The stator 4 is fitted in the cover 5. The stator 4 is fitted in the first cup body 6A or the second cup body 6B. In the example embodiment, the stator 4 is fitted in and fixed to the inner circumferential surface of the circumferential wall 9 of the first cup body 6A. The stator 4 is radially opposed to the rotor 2 with a gap interposed therebetween. The stator 4 is opposed to the rotor 2 from the radial outside. The stator 4 includes a stator core 26, a coil 27, and an insulating unit 28. The stator core 26 has an annular shape surrounding the radial outside of the rotor 2. The stator core 26 is radially opposed to the rotor magnet 2a with a gap interposed therebetween. The stator core 26 is opposed to the rotor magnet 2a from the radial outside.

The coil 27 is installed in the stator core 26. The coil 27 is indirectly mounted on the stator core 26 with the insulating unit 28 interposed therebetween. The insulating unit 28 includes a portion disposed between the stator core 26 and the coil 27. The insulating unit 28 includes a portion radially opposed to the coil 27. That is, the insulating unit 28 is radially opposed to the coil 27. The insulating unit 28 includes an outer circumferential-side insulating unit 28a located on the radial outside of the coil 27 and an inner circumferential-side insulating unit 28b located on the radial inside of the coil 27. The outer circumferential-side insulating unit 28a is opposed to the coil 27 from the radial outside. The inner circumferential-side insulating unit 28b is opposed to the coil 27 from the radial inside. The substrate 20 is attached and fixed to the outer circumferential side insulating unit 28a.

The substrate 20 is located on one side in the axial direction of the stator 4. The substrate 20 has a disc shape. The substrate 20 has an annular plate shape centered on the center axis J. The plate surface of the substrate 20 faces the axial direction, and spreads in the direction orthogonal to the center axis J. The motor shaft 3 extends in the axial direction on the radial inside of the substrate 20.

The substrate 20 is electrically connected to the stator 4. The substrate 20 is electrically connected to a coil lead wire (not illustrated) of the coil 27. The substrate 20 is connected to the coil lead line at the outer circumferential edge of the plate surface facing one side in the axial direction of the substrate 20. The substrate 20 is located on one side in the axial direction of the rotor magnet 2a. The substrate 20 is disposed at a position that overlaps the stator 4 and the rotor magnet 2a when being viewed from the axial direction. The substrate 20 is surrounded from the radial outside by the outer circumferential-side insulating unit 28a. The substrate 20 is disposed at a position overlapping the outer circumferential-side insulating unit 28a as viewed from the radial direction. In the example of the example embodiment, the substrate 20 is disposed at a position overlapping the flange 10 of the second cup body 6B as viewed in the radial direction.

Although not illustrated, an integrated circuit and a capacitor are mounted on the plate surface of the substrate 20. The substrate 20 is disposed while the plate surface on which the integrated circuit and the capacitor are mounted faces one side in the axial direction. The integrated circuit has a rectangular plate shape. The capacitor has a columnar shape. The capacitor extends in the axial direction. The surface facing one side in the axial direction of the capacitor is axially opposed to the bottom wall 8 of the second cup body 6B. A surface facing one side in the axial direction of the capacitor is disposed with a gap interposed between the surface facing one side in the axial direction of the capacitor and a surface facing the other side in the axial direction of the bottom wall 8.

Figure 3:
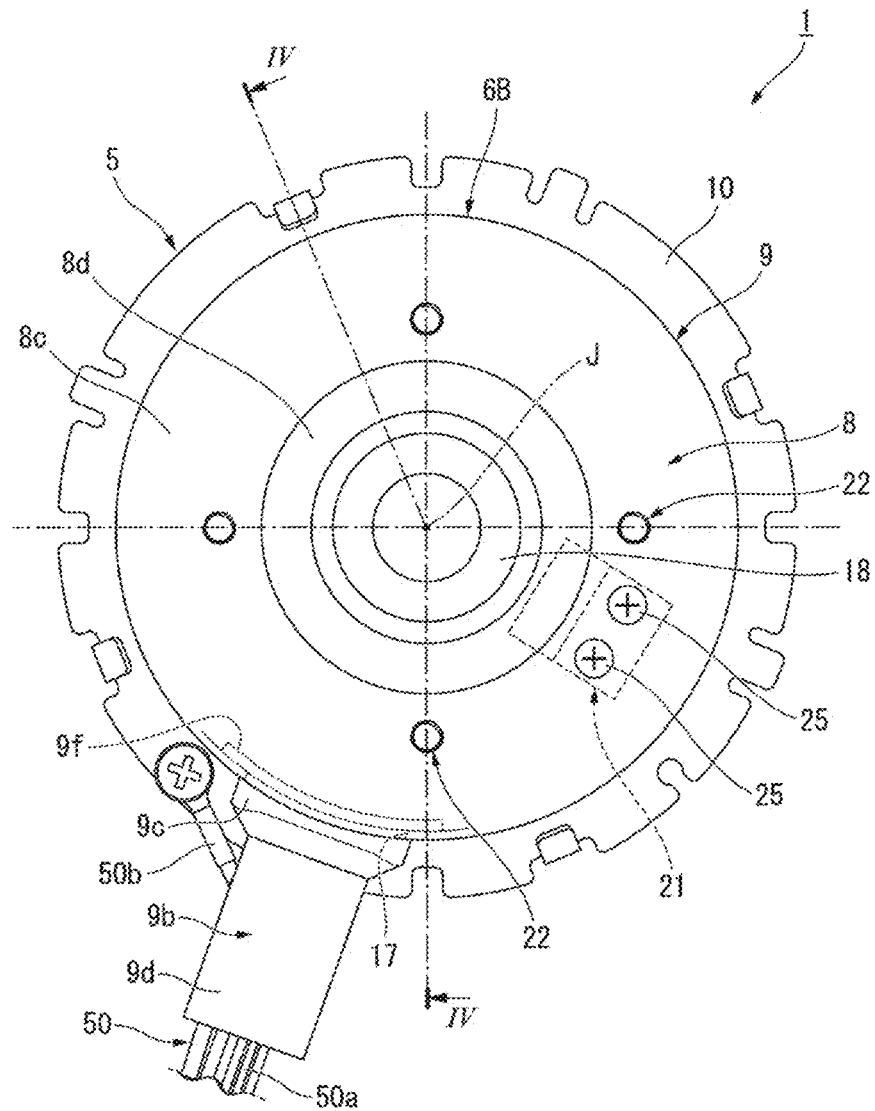
FIG. 3 is a plan view illustrating a motor according to an example embodiment of the present disclosure as viewed from the other side in an axial direction.

The heat sink 21 is disposed on one side in the axial direction of the substrate 20. The heat sink 21 contacts thermally with the integrated circuit. The heat sink 21 is fixed to the cover 5. As illustrated in FIG. 3, the heat sink 21 is attached and fixed to the bottom wall 8 of the second cup body 6B by the screw member 25. The screw member 25 fastens the flat unit 8c of the second cup body 6B and the heat sink 21. A plurality of screw members 25 are provided. The plurality of screw members 25 are circumferentially disposed away from each other in the bottom wall 8.

In the example embodiment, the elastic modulus of the sleeve 50c is smaller than the elastic modulus of the coated portion of the cable 50a, and the sleeve 50c is soft, so that a contact area between the plurality of cables 50a passing through the sleeve 50c and the sleeve 50c is secured. The frictional force between the sleeve 50c and the cable 50a is increased, and the cable 50a is difficult to move in the sleeve 50c. The sleeve 50c and the cable 50a are bundled by the binding unit 50d, so that the sleeve 50c and the cable 50a further contact with each other. Because the sleeve 50c has a diameter larger than that of the wiring lead port 51 and is opposed to the wiring lead port 51 from the inside of the cover 5, the sleeve 50c is caught by the wiring lead port 51 when the cable 50a is pulled, and the cable 50a is prevented from slipping out of the cover 5. The cable 50a is also prevented from slipping out of the sleeve 50c. Even if the cable 50a is strongly pulled, the sleeve 50c contacting with the wiring lead port 51 absorbs the impact to prevent the damage of the cable 50a. Even if the binding unit 50d is tightened too much during the manufacturing of the motor, the soft sleeve 50c functions as a cushioning member to prevent the damage of the cable 50a.

In the example embodiment, the sleeve 50c contacts with all the plurality of cables 50a, so that the cable 50a can further be prevented from slipping out. The length of the sleeve 50c in the direction in which the cable 50a extends is longer than the length of the binding unit 50d, and the binding unit 50d is located inside the both the ends of the sleeve 50c. That is, the sleeve 50c can be lengthened, so that the contact area between the sleeve 50c and the cable 50a can be enlarged to further prevent the cable 50a from slipping out. When the sleeve 50c contacts with the wiring lead port 51, the sleeve 50c is easily elastically deformed and easily functions as the cushioning member against the pull of the cable 50a.

In the example embodiment, the frictional coefficient between the sleeve 50c and the cable 50a is larger than the friction force between the sleeve 50c and the binding unit 50d. That is, the frictional coefficient between the sleeve 50c and the cable 50a is increased, so that the cable 50a can further prevented from slipping out. Further, the cable 50a extends while being curved between the wiring lead port 51 and the substrate 20. That is, because the cable 50a is bent in the cover 5, the connection state between the cable 50a and the substrate 20 is maintained well even if the cable 50a is pulled.

In the example embodiment, the wiring lead port 51 is disposed in the elastically deformable bush 9b, so that a sealing property of the wiring lead port 51 can be enhanced. Because the wiring lead port 51 is a flat cross shape including the first slit 51a and the second slit 51b, the pre-binding individual cables 50a passes easily through the wiring lead port 51 during the manufacturing. After the assembly of the motor, the sleeve 50c having the diameter larger than that of cable 50a hardly slips out from the wiring lead port 51. The length of the first slit 51a is smaller than the outer diameter of the sleeve 50c, so that the sleeve 50c hardly slips out of the wiring lead port 51.

The bush 9b includes the flange 9f, so that the bush 9b hardly slips out of the through-hole 17. Thus, the bush 9b can stably prevent the cable 50a from slipping out. Because the sleeve 50c is the heat-shrinkable tube, the contact area between the sleeve 50c and the cable 50a is enlarged.

The present disclosure is not limited to the example embodiment. For example, as described below, the configuration or the like can be changed without departing from the scope of the present disclosure.

In the example embodiment, the wiring lead port 51 of the bush 9b has the flat cross shape. However, the present disclosure is not limited to this configuration. For example, the wiring lead port 51 may have a slit shape that is open to the bottom of the bush 9b and reaches the outer circumferential edge of the flange 9f. The wiring lead port 51 may be a flattened rectangular shape or the like. The through-hole 17 may be made in the bottom wall 8, and the bush 9b may be provided in the bottom wall 8. During assembly of the motor, a wedge member may be inserted from the inside of the cover 5 into the wiring lead port 51. Consequently, when the cable 50a is pulled, the wedge member is drawn into the wiring lead port 51 to further prevent the cable 50a from slipping out. As illustrated in FIG. 5, the wiring lead port 51 may directly be provided in the circumferential wall 9 without providing the bush 9b in the circumferential wall 9.

Additionally, a combination of the configurations (components) described in the above example embodiment, modifications, and notes may be made without departing from the scope of the present disclosure, or additions, omissions, substitutions, and the like of the configuration can be made. The present disclosure is not limited to the above example embodiment, but is limited only by the scope of the claims.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A motor comprising:
a rotor and a stator;
a substrate electrically connected to the stator;
a cover made of sheet metal and accommodating the stator and the substrate; and
a wiring assembly electrically connected to the substrate; wherein
the cover includes a first cup body and a second body defined by separate members, first cup body including a wiring lead port, which is open to a wall of the cover and communicates with an outside and an inside of the cover;
the wiring assembly includes:
a plurality of cables connected to the substrate and extending from the inside of the cover to the outside through the wiring lead port;
a sleeve with a tubular shape into which the plurality of cables are inserted, the sleeve having an elastic modulus smaller than an elastic modulus of a coated portion of the cable; and
a binder that bundles the plurality of cables through the sleeve;
the sleeve is opposed to the wiring lead port from the inside of the cover;
an outer diameter of the sleeve is larger than an inner diameter of the wiring lead port;
the first cup body includes:
a through-hole penetrating the wall, an entirety of a circumference of the through-hole being surrounded by the wall; and
a bush that is elastically deformable and attached in the through-hole; and the wiring lead port is disposed in the bush.

2. The motor according to claim 1, wherein the sleeve contacts with all of the plurality of cables.

3. The motor according to claim 1, wherein
a length of the sleeve in a direction in which the cable extends is longer than a length of the binder; and
the binder is located inside both ends of the sleeve.

4. The motor according to claim 1, wherein a frictional coefficient between the sleeve and the cable is greater than a frictional coefficient between the sleeve and the binder.

5. The motor according to claim 1, wherein the cable extends curvedly between the wiring lead port and the substrate.

6. The motor according to claim 1, wherein
the wiring lead port includes a first slit and a second slit that extend while crossing each other; and
a length of the first slit is shorter than a length of the second slit.

7. The motor according to claim 6, wherein the length of the first slit is smaller than the outer diameter of the sleeve.

8. The motor according to claim 1, wherein
the bush includes a flange located in the cover; and
the flange is opposed to the wall from the inside of the cover.

9. The motor according to claim 1, wherein the sleeve includes a heat-shrinkable tube.

10. The motor according to claim 1, wherein
the bush includes a groove which is fitted over a portion of the wall surrounding the through-hole, the bush contacting inner and outer surfaces of the cover.

* * * * *